United States Patent
Mizuno et al.

(10) Patent No.: US 7,606,650 B2
(45) Date of Patent: Oct. 20, 2009

(54) IN-CYLINDER PRESSURE DETECTION DEVICE AND METHOD FOR INTERNAL COMBUSTION ENGINE, AND ENGINE CONTROL UNIT

(75) Inventors: Takahide Mizuno, Wako (JP); Shusuke Akazaki, Wako (JP); Hiroyuki Sugiura, Wako (JP); Yuji Yamamoto, Wako (JP); Mitsuo Hashizume, Wako (JP); Kentaro Onuma, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 342 days.

(21) Appl. No.: 11/798,030

(22) Filed: May 9, 2007

(65) Prior Publication Data

US 2007/0261482 A1 Nov. 15, 2007

(30) Foreign Application Priority Data

May 9, 2006 (JP) ............................. 2006-130067

(51) Int. Cl.
*G01L 1/00* (2006.01)
*G01M 15/00* (2006.01)

(52) U.S. Cl. ..................................... 701/102
(58) Field of Classification Search ................ 701/102, 701/101, 114; 123/435; 73/116, 117.3
See application file for complete search history.

(56) References Cited

U.S. PATENT DOCUMENTS 6,684,151 B1 1/2004 Ring

2002/0066445 A1 6/2002 Thomas

FOREIGN PATENT DOCUMENTS

| DE | 199 00 738 | | 6/2000 |
|----|------------|---|--------|
| EP | 1 255 100 | | 11/2002 |
| EP | 1 748 175 | | 1/2007 |
| JP | 2006-138205 A | * | 6/2006 |
| JP | 2006-274966 A | * | 10/2006 |
| JP | 2007-303407 A | * | 11/2007 |
| WO | WO 2005/108763 | | 11/2005 |
| WO | WO 2005/113969 | | 12/2005 |

OTHER PUBLICATIONS

European Search Report, European Patent Application No. EP 07 00 9314, filed Aug. 14, 2007.

* cited by examiner

*Primary Examiner*—Hieu T Vo
(74) *Attorney, Agent, or Firm*—Squires, Sanders & Dempsey L.L.P.

(57) ABSTRACT

An in-cylinder pressure detection device for an internal combustion engine, which is capable of calculating a hysteresis amount properly to thereby detect in-cylinder pressure with high accuracy. The in-cylinder pressure detection device comprises an in-cylinder pressure sensor that detects in-cylinder pressure as a detected in-cylinder pressure. The in-cylinder pressure detection device estimates an in-cylinder pressure generated when combustion is not performed in the cylinder, as a motoring pressure, calculates a hysteresis amount indicative of a difference between the detected in-cylinder pressure and an actual in-cylinder pressure, based on the detected in-cylinder pressure and the motoring pressure obtained during the exhaust stroke of the engine, and corrects the detected in-cylinder pressure based on the calculated hysteresis amount.

21 Claims, 9 Drawing Sheets

IN-CYLINDER PRESSURE DETECTION DEVICE AND METHOD FOR INTERNAL COMBUSTION ENGINE, AND ENGINE CONTROL UNIT

BACKGROUND OF THE INVENTION

1. Field of the Invention

The present invention relates to an in-cylinder pressure detection device for an internal combustion engine, which detects in-cylinder pressure defined as pressure within a cylinder of the engine, a method of detecting the in-cylinder pressure, and an engine control unit.

2. Description of the Related Art

Conventionally, there has been disclosed an in-cylinder pressure detection device e.g. in Japanese Laid-Open Patent Publication (Kokai) No. H09-133042. This in-cylinder pressure detection device has in-cylinder pressure sensors provided for a plurality of (four) cylinders, respectively. Each of the in-cylinder pressure sensors is formed by an annular piezoelectric element, and is screwed into a cylinder head together with a spark plug to be nipped between the spark plug and the cylinder head. In the in-cylinder pressure detection device, the average value of four detection values each obtained at a predetermined crank angle position of an associated cylinder during a compression stroke is calculated, and a relation between each detection value and the calculated average value is obtained and stored on a cylinder-by-cylinder basis. Then, an average value corresponding to a current detection value is obtained from the stored relations, and the obtained average value is used as a value indicative of a final in-cylinder pressure. Thus, variations in the detection values associated with the respective cylinders are compensated for.

An in-cylinder pressure sensor of the above-mentioned type is screwed into a cylinder head together with a spark plug, as mentioned above, so that even when in-cylinder pressure decreases, pressure remains on a screw part of the spark plug, which makes a detection value detected by the sensor larger than an actual in-cylinder pressure by an amount corresponding to the remaining pressure (hereinafter referred to as "the hysteresis amount"). The above-described in-cylinder pressure detection device, which simply uses the average value of detection values from the respective in-cylinder pressure sensors as a detected in-cylinder pressure, cannot accommodate differences between the detection values and the actual in-cylinder pressure, which causes degradation of accuracy of the detected in-cylinder pressure.

SUMMARY OF THE INVENTION

It is an object of the invention to provide an in-cylinder pressure detection device and method for an internal combustion engine and an engine control unit, which are capable of properly calculating a hysteresis amount to thereby detect in-cylinder pressure with high accuracy.

To attain the above object, in a first aspect of the present invention, there is provided an in-cylinder pressure detection device for an internal combustion engine, for detecting in-cylinder pressure defined as pressure within a cylinder of the engine, comprising an in-cylinder pressure sensor that detects an in-cylinder pressure as a detected in-cylinder pressure, motoring pressure-estimating means for estimating the in-cylinder pressure generated when combustion is not performed in the cylinder, as a motoring pressure, hysteresis amount-calculating means for calculating a hysteresis amount indicative of a difference between the detected in-cylinder pressure and an actual in-cylinder pressure, based on the detected in-cylinder pressure and the motoring pressure obtained during an exhaust stroke of the engine, and correction means for correcting the detected in-cylinder pressure based on the calculated hysteresis amount.

This in-cylinder pressure detection device detects the in-cylinder pressure by the in-cylinder pressure sensor, and estimates an in-cylinder pressure generated when combustion is not performed in the cylinder, as a motoring pressure. Further, the hysteresis amount indicative of the difference between the detected in-cylinder pressure and the actual in-cylinder pressure is calculated based on the detected in-cylinder pressure and the motoring pressure obtained during the exhaust stroke, and the detected in-cylinder pressure is corrected based on the calculated hysteresis amount. During the exhaust stroke, combustion is not performed in the cylinder, and hence the actual in-cylinder pressure and the motoring pressure are substantially equal to each other. Therefore, the hysteresis amount can be properly calculated based on the detected in-cylinder pressure and the motoring pressure obtained during the exhaust stroke. Further, the detected in-cylinder pressure is corrected based on the thus properly calculated hysteresis amount, it is possible to detect the in-cylinder pressure accurately.

Preferably, the hysteresis amount-calculating means comprises comparison result parameter-calculating means for calculating a comparison result parameter indicative of a result of comparison between the detected in-cylinder pressure and the motoring pressure, and calculates the hysteresis amount based on the calculated comparison result parameter.

During the exhaust stroke, the actual in-cylinder pressure and the motoring pressure are substantially equal to each other as mentioned above, and hence when the hysteresis amount is small, the detected in-cylinder pressure becomes substantially equal to the motoring pressure, and as the hysteresis amount is larger, the difference between the detected in-cylinder pressure and the motoring pressure becomes larger. Therefore, the result of comparison between the detected in-cylinder pressure and the motoring pressure, which are obtained during the exhaust stroke, excellently represents the hysteresis amount. With the configuration of this preferred embodiment, the comparison result parameter indicative of the comparison result is calculated, and then the hysteresis amount is calculated based on the calculated comparison result parameter. Therefore, it is possible to calculate the hysteresis amount more properly.

More preferably, the comparison result parameter-calculating means calculates the comparison result parameter based on the detected in-cylinder pressure and the motoring pressure obtained at a predetermined time during the exhaust stroke, and the hysteresis amount-calculating means further comprises decrease start time-detecting means for detecting a decrease start time at which the in-cylinder pressure starts decreasing after start of an expansion stroke of the engine, and weight-calculating means for calculating a weight of the comparison result parameter for the hysteresis amount at an arbitrary time between the decrease start time and the predetermined time according to a period length ratio between a length of a period from the decrease start time to the arbitrary time and a length of a period from the decrease start time to the predetermined time, and calculates the hysteresis amount at the arbitrary time, using the calculated weight and the comparison result parameter.

With this configuration, the comparison result parameter is calculated based on the detected in-cylinder pressure and the motoring pressure obtained at the predetermined time during the exhaust stroke, and then the decrease start time at which the in-cylinder pressure starts decreasing after the start of the expansion stroke of the engine is detected. Further, the weight of the comparison result parameter for the hysteresis amount at the arbitrary time between the decrease start time and the predetermined time is calculated according to the period length ratio between the length of the period from the decrease start time to the arbitrary time and the length of the period from the decrease start time to the predetermined time. Furthermore, the hysteresis amount at the arbitrary time is calculated using the calculated weight and the comparison result parameter.

The hysteresis amount tends to progressively increase with the lapse of time after the in-cylinder pressure starts decreasing, and then keep substantially constant during the exhaust stroke. Thus, the hysteresis amount progressively becomes larger with the lapse of time during the period from the decrease start time to the predetermined time during the exhaust stroke. Therefore, by calculating the weight at the arbitrary time according to the period length ratio as described above, it is possible to calculate the hysteresis amount matching the changing characteristics mentioned above.

Further preferably, the weight-calculating means calculates the weight such that the weight is proportional to the period length ratio.

With this configuration, since the weight is calculated such that the weight is proportional to the period length ratio, it is possible to calculate the weight at an arbitrary time with ease by simply distributing the weight proportionally according to the period length ratio.

Alternatively, the weight-calculating means calculates the weight such that the weight is proportional to the radical root of the period length ratio.

It was confirmed by experiment that the hysteresis amount tends to increase sharply in an early stage after the start of decrease of the in-cylinder pressure, and then increase gently, and is proportional to the radical root of the period length ratio. Therefore, by calculating the weight as described above, it is possible to calculate the weight such that the weight more properly match actual changing characteristics of the hysteresis amount, to thereby calculate the hysteresis amount more accurately.

More preferably, the comparison result parameter-calculating means calculates the comparison result parameter based on the detected in-cylinder pressure and the motoring pressure obtained at a predetermined time during the exhaust stroke, and the hysteresis amount-calculating means further comprises decrease start time-detecting means for detecting a decrease start time at which the in-cylinder pressure starts decreasing after start of an expansion stroke of the engine, and weight-calculating means for calculating a weight of the comparison result parameter for the hysteresis amount at an arbitrary time between the decrease start time and the predetermined time, according to a ratio between a difference between the motoring pressure at the decrease start time and the motoring pressure at the arbitrary time and a difference between the motoring pressure at the decrease start time and the motoring pressure at the predetermined time, and calculates the hysteresis amount at the arbitrary time, using the calculated weight and the comparison result parameter.

With this configuration, the comparison result parameter is calculated based on the detected in-cylinder pressure and the motoring pressure obtained at the predetermined time during the exhaust stroke, and a decrease start time at which the in-cylinder pressure starts decreasing after start of the expansion stroke is detected. Further, the weight of the comparison result parameter for the hysteresis amount at the arbitrary time between the decrease start time and the predetermined time is calculated according to the ratio between the difference between the motoring pressure at the decrease start time and the motoring pressure at the arbitrary time and the difference between the motoring pressure at the decrease start time and the motoring pressure at the predetermined time. Furthermore, the hysteresis amount at the arbitrary time is calculated using the calculated weight and the comparison result parameter.

It was confirmed by experiment that the hysteresis amount tends to decrease sharply in the early stage of the expansion stroke, and then decrease gently, and the reduction characteristics are closely analogous to the changing characteristics of the hysteresis amount. Therefore, by calculating the weight as described above, it is possible to calculate the weight such that the weight more properly match the actual changing characteristics of the hysteresis amount, to thereby calculate the hysteresis amount more accurately. Further, since the motoring pressure originally calculated so as to obtain the comparison result parameter can be used without processing, it is possible to reduce computation load on the in-cylinder pressure detection device.

More preferably, the engine is configured to carry out fuel cut-off operation for cutting off supply of fuel to the engine when predetermined conditions are satisfied, the in-cylinder pressure detection device further comprises fuel cut-off determination means for determining whether or not the fuel cut-off operation is being carried out, and the hysteresis amount-calculating means calculates the hysteresis amount based on the comparison result parameter calculated during the fuel cut-off operation.

During the fuel cut-off (hereinafter abbreviated as "F/C") operation, combustion of the mixture is not performed in the cylinder. Therefore, by using the comparison result parameter calculated during the fuel cut-off operation as mentioned above, it is possible to calculate the hysteresis amount more properly without being influenced at all by pressure generated by combustion.

To attain the above object, in a second aspect of the present invention, there is provided a method of detecting in-cylinder pressure defined as pressure within a cylinder of an internal combustion engine, comprising an in-cylinder pressure-detecting step of detecting an in-cylinder pressure as a detected in-cylinder pressure, a motoring pressure-estimating step of estimating the in-cylinder pressure generated when combustion is not performed in the cylinder, as a motoring pressure, a hysteresis amount-calculating step of calculating a hysteresis amount indicative of a difference between the detected in-cylinder pressure and an actual in-cylinder pressure, based on the detected in-cylinder pressure and the motoring pressure obtained during an exhaust stroke of the engine, and a correction step of correcting the detected in-cylinder pressure based on the calculated hysteresis amount.

With the configuration of the second aspect of the present invention, it is possible to obtain the same advantageous effects as provided by the first aspect of the present invention.

Preferably, the hysteresis amount-calculating step comprises a comparison result parameter-calculating step of calculating a comparison result parameter indicative of a result of comparison between the detected in-cylinder pressure and the motoring pressure, and includes calculating the hysteresis amount based on the calculated comparison result parameter.

More preferably, the comparison result parameter-calculating step includes calculating the comparison result parameter based on the detected in-cylinder pressure and the motoring pressure obtained at a predetermined time during the exhaust stroke, and the hysteresis amount-calculating step further comprises a decrease start time-detecting step of detecting a decrease start time at which the in-cylinder pressure starts decreasing after start of an expansion stroke of the engine, and a weight-calculating step of calculating a weight of the comparison result parameter for the hysteresis amount at an arbitrary time between the decrease start time and the predetermined time according to a period length ratio between a length of a period from the decrease start time to the arbitrary time and a length of a period from the decrease start time to the predetermined time, and includes calculating the hysteresis amount at the arbitrary time, using the calculated weight and the comparison result parameter.

Further preferably, the weight-calculating step includes calculating the weight such that the weight is proportional to the period length ratio.

Further preferably, the weight-calculating step includes calculating the weight such that the weight is proportional to a radical root of the period length ratio.

More preferably, the comparison result parameter-calculating step includes calculating the comparison result parameter based on the detected in-cylinder pressure and the motoring pressure obtained at a predetermined time during the exhaust stroke, and the hysteresis amount-calculating step further comprises a decrease start time-detecting step of detecting a decrease start time at which the in-cylinder pressure starts decreasing after start of an expansion stroke of the engine, and a weight-calculating step of calculating a weight of the comparison result parameter for the hysteresis amount at an arbitrary time between the decrease start time and the predetermined time, according to a ratio between a difference between the motoring pressure at the decrease start time and the motoring pressure at the arbitrary time and a difference between the motoring pressure at the decrease start time and the motoring pressure at the predetermined time, and includes calculating the hysteresis amount at the arbitrary time, using the calculated weight and the comparison result parameter.

More preferably, the engine is configured to carry out fuel cut-off operation for cutting off supply of fuel to the engine when predetermined conditions are satisfied, and the method further comprises a fuel cut-off determination step of determining whether or not the fuel cut-off operation is being carried out, the hysteresis amount-calculating step including calculating the hysteresis amount based on the comparison result parameter calculated during the fuel cut-off operation.

With the configurations of these preferred embodiments, it is possible to obtain the same advantageous effects as provided by the corresponding preferred embodiments of the first aspect of the present invention.

To attain the above object, in a third aspect of the present invention, there is provided an engine control unit including a control program for causing a computer to detect in-cylinder pressure defined as pressure within a cylinder of an internal combustion engine, wherein the control program causes the computer to detect an in-cylinder pressure as a detected in-cylinder pressure, estimate the in-cylinder pressure generated when combustion is not performed in the cylinder, as a motoring pressure, calculate a hysteresis amount indicative of a difference between the detected in-cylinder pressure and an actual in-cylinder pressure, based on the detected in-cylinder pressure and the motoring pressure obtained during an exhaust stroke of the engine, and correct the detected in-cylinder pressure based on the calculated hysteresis amount.

With the configuration of the third aspect of the present invention, it is possible to obtain the same advantageous effects as provided by the first aspect of the present invention.

Preferably, when causing the computer to calculate the hysteresis amount, the control program causes the computer to calculate a comparison result parameter indicative of a result of comparison between the detected in-cylinder pressure and the motoring pressure, and the control program causes the computer to calculate the hysteresis amount based on the calculated comparison result parameter.

More preferably, when causing the computer to calculate the comparison result parameter, the control program causes the computer to calculate the comparison result parameter based on the detected in-cylinder pressure and the motoring pressure obtained at a predetermined time during the exhaust stroke, and when causing the computer to calculate the hysteresis amount, the control program causes the computer to detect a decrease start time at which the in-cylinder pressure starts decreasing after start of an expansion stroke of the engine, and calculate a weight of the comparison result parameter for the hysteresis amount at an arbitrary time between the decrease start time and the predetermined time according to a period length ratio between a length of a period from the decrease start time to the arbitrary time and a length of a period from the decrease start time to the predetermined time, and the control program causes the computer to calculate the hysteresis amount at the arbitrary time, using the calculated weight and the comparison result parameter.

Further preferably, when causing the computer to calculate the weight, the control program causes the computer to calculate the weight such that the weight is proportional to the period length ratio.

Further preferably, when causing the computer to calculate the weight, the control program causes the computer to calculate the weight such that the weight is proportional to a radical root of the period length ratio.

More preferably, when causing the computer to calculate the comparison result parameter, the control program causes the computer to calculate the comparison result parameter based on the detected in-cylinder pressure and the motoring pressure obtained at a predetermined time during the exhaust stroke, and when causing the computer to calculate the hysteresis amount, the control program causes the computer to detect a decrease start time at which the in-cylinder pressure starts decreasing after start of an expansion stroke of the engine, and calculate a weight of the comparison result parameter for the hysteresis amount at an arbitrary time between the decrease start time and the predetermined time, according to a ratio between a difference between the motoring pressure at the decrease start time and the motoring pressure at the arbitrary time and a difference between the motoring pressure at the decrease start time and the motoring pressure at the predetermined time, the control program causing the computer to calculate the hysteresis amount at the arbitrary time, using the calculated weight and the comparison result parameter.

More preferably, the engine is configured to carry out fuel cut-off operation for cutting off supply of fuel to the engine when predetermined conditions are satisfied, and the control program causes the computer to determine whether or not the fuel cut-off operation is being carried out, wherein when causing the computer to calculate the hysteresis amount, the control program causes the computer to calculate the hysteresis amount based on the comparison result parameter calculated during the fuel cut-off operation.

With the configurations of these preferred embodiments, it is possible to obtain the same advantageous effects as provided by the corresponding preferred embodiments of the first aspect of the present invention.

The above and other objects, features, and advantages of the invention will become more apparent from the following detailed description taken in conjunction with the accompanying drawings.

DETAILED DESCRIPTION OF THE PREFERRED EMBODIMENTS

Figure 1:
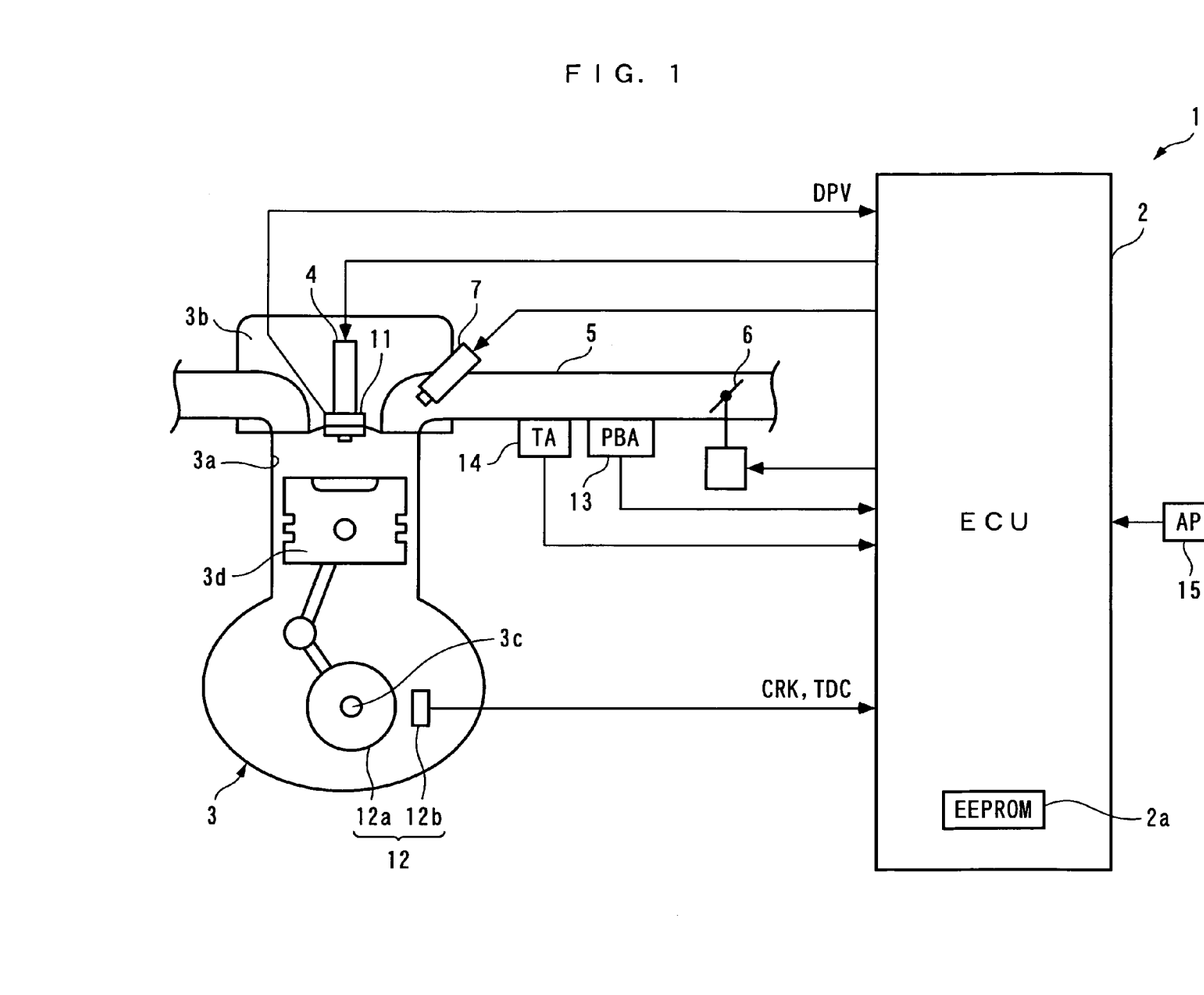
FIG. 1 is a schematic view of an in-cylinder detection device according to the present invention, together with an engine to which is applied the in-cylinder detection device.

The invention will now be described in detail with reference to the drawings showing preferred embodiments thereof. FIG. 1 schematically shows an in-cylinder detection device 1 according to the embodiments, and an internal combustion engine (hereinafter simply referred to as "the engine") 3 to which the in-cylinder detection device 1 is applied. The engine 3 is e.g. a four-stroke cycle gasoline engine installed on a vehicle, not shown.

A cylinder 3a of the engine 3 has a spark plug 4 inserted therein. The spark plug 4 has a high voltage applied thereto in timing corresponding to ignition timing by a drive signal from the ECU 2 of the in-cylinder detection device 1, and subsequent interruption of the application of the high voltage causes a spark discharge to ignite an air-fuel mixture within the cylinder 3a.

The spark plug 4 has an in-cylinder pressure sensor 11 integrally mounted thereon. The in-cylinder pressure sensor 11, which is formed by an annular piezoelectric element, is screwed into a cylinder head 3b together with the spark plug 4 to be nipped between the spark plug 4 and the cylinder head 3b. The in-cylinder pressure sensor 11 delivers to the ECU 2 a detection signal indicative of a sensed amount of change in the pressure within the cylinder 3a. The ECU 2 calculates the pressure within the cylinder 3a (hereinafter referred to as "the in-cylinder pressure") based on an output DPV from the in-cylinder pressure sensor 11.

The engine 3 is provided with a crank angle sensor 12 (decrease start time-detecting means). The crank angle sensor 12 is comprised of a magnet rotor 12a fitted on a crankshaft 3c, and an MRE pickup 12b, and delivers a CRK signal and a TDC signal, which are pulse signals, to the ECU 2 in accordance with rotation of the crankshaft 3c.

Each pulse of the CRK signal is generated whenever the crankshaft 3c rotates through a predetermined crank angle (e.g. 1°), and the ECU 2 calculates rotational speed NE of the engine 3 (hereinafter referred to as "the engine speed NE") based on the CRK signal. Further, the TDC signal indicates that each piston 3d in the engine 3 is in a predetermined crank angle position slightly before the TDC position at the start of the intake stroke, and each pulse of the TDC signal is generated whenever the crankshaft 3c rotates through a predetermined crank angle. The ECU 2 calculates a crank angle CA with respect to the TDC signal, based on the TDC signal and the CRK signal.

An intake pipe 5 of the engine 3 has a throttle valve 6, an intake pipe pressure sensor 13, and an intake air temperature sensor 14 arranged therein in the mentioned order from the upstream side. The degree of opening of the throttle valve 6 is controlled by the ECU 2, whereby the amount of intake air is controlled. The intake pipe pressure sensor 13 detects pressure PBA within the intake pipe 5 (hereinafter referred to as "the intake pipe pressure PBA") as an absolute pressure, to deliver a detection signal indicative of the sensed intake pipe pressure PBA to the ECU 2, while the intake air temperature sensor 14 detects temperature within the intake pipe 5 (hereinafter referred to as "the intake air temperature") to deliver a detection signal indicative of the sensed intake air temperature to the ECU 2.

An injector 7 is inserted into the intake pipe 5 at a location downstream of the throttle valve 6 in a manner facing an intake port, not shown. A fuel injection amount TOUT of fuel to be injected by the injector 7 is controlled by the ECU 2.

Further, a detection signal indicative of a sensed stepped-on amount AP of an accelerator pedal, not shown, of the vehicle (hereinafter referred to as "the accelerator opening AP") is delivered to the ECU 2 from an accelerator opening sensor 15.

The ECU 2 is implemented by a microcomputer comprised of an I/O interface, a CPU, a RAM, a ROM, and an EEPROM 2a. The ECU 2 determines operating conditions of the engine 3, based on the detection signals delivered from the above-mentioned sensors 11 to 15, then calculating a final in-cylinder pressure PCYLF as an in-cylinder pressure, based on the determined operating conditions, and executing an engine control process including a fuel injection control process. In the present embodiment, the ECU 2 corresponds to motoring pressure-estimating means, hysteresis amount-calculating means, correction means, comparison result parameter-calculating means, decrease start time-detecting means, weight-calculating means, and fuel cut-off determination means.

Further, during decelerating operation, e.g. when the accelerator opening AP is substantially equal to a predetermined opening degree (e.g. 0°), and when the engine speed NE is higher than a predetermined rotational speed (e.g. 1000 rpm), the ECU 2 controls the fuel injection amount TOUT to 0, whereby fuel cut-off operation (hereinafter referred to as "the F/C operation") for cutting off fuel supply is performed.

Figure 2:
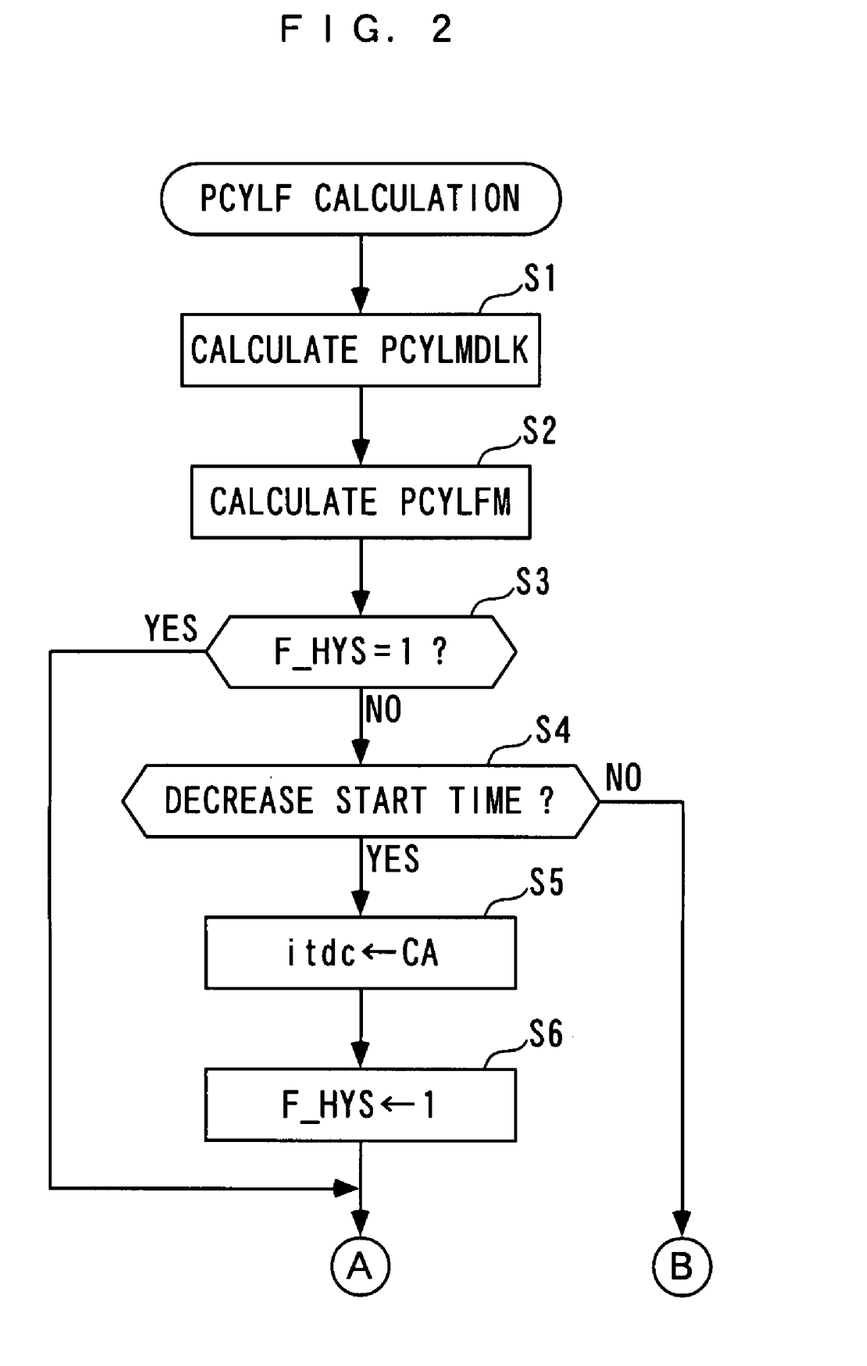
FIG. 2 is a flowchart of a process for calculating a final in-cylinder pressure, according to a first embodiment.
Figure 3:
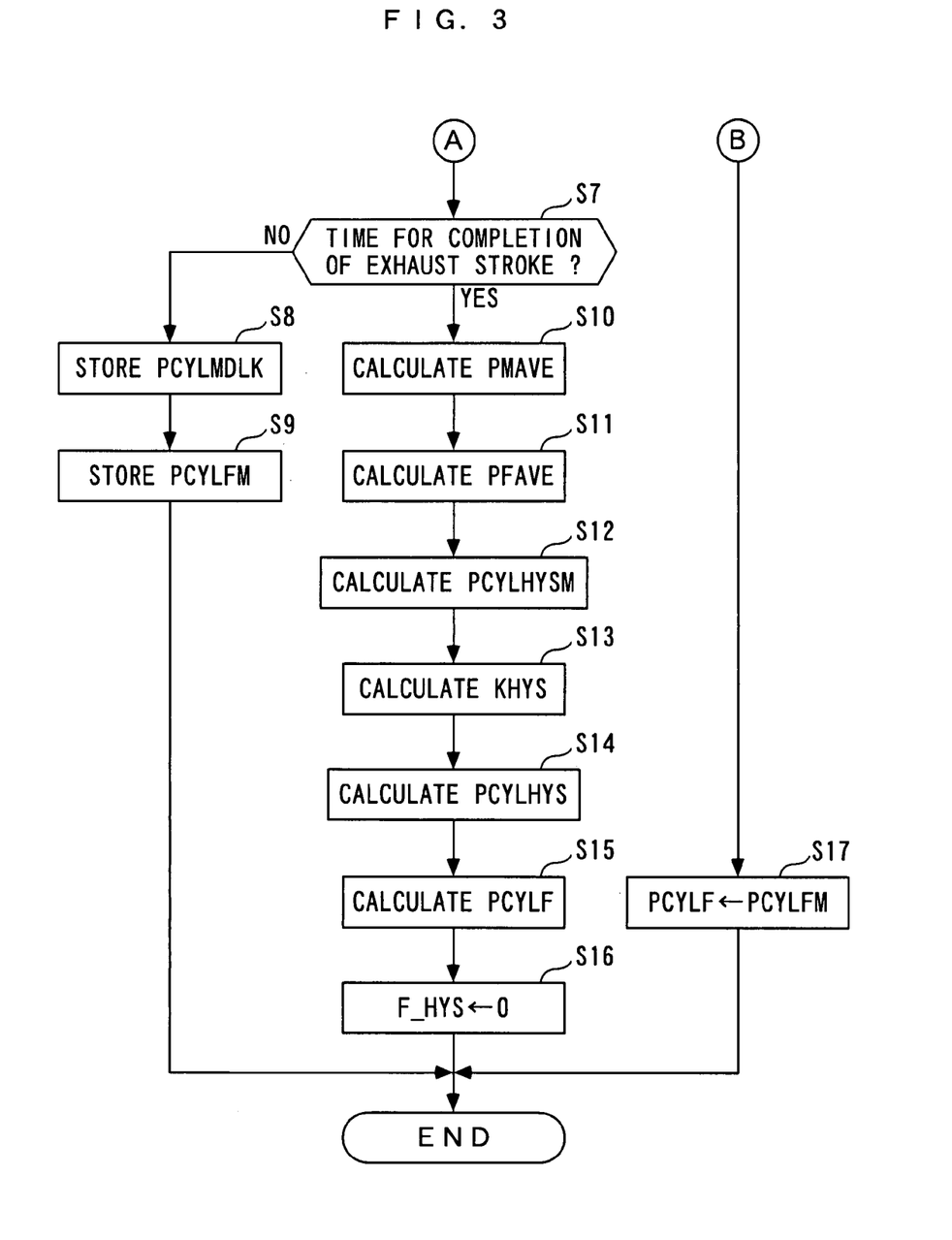
FIG. 3 is a flowchart showing a continuation of the process shown in FIG. 2.

FIGS. 2 and 3 show a process for calculating the final in-cylinder pressure PCYLF, according to a first embodiment of the present invention. This process is executed in timing synchronous with generation of each pulse of the CRK signal. First, in a step 1 (shown as S1 in abbreviated form in FIG. 2; the following steps are also shown in abbreviated form), a motoring pressure PCYLMDLK is calculated.

The motoring pressure PCYLMDLK(n) is an in-cylinder pressure which is generated in the cylinder when combustion is not performed. The motoring pressure PCYLMDLK(n) is calculated by the gas state equation, based on an intake air amount QA(n), an intake air temperature TA(n), and a volume Vc(n) of the cylinder 3a. The volume Vc(n) of the cylinder 3a is defined as the volume of a space defined by the cylinder head 3b, the cylinder 3a, and the piston 3d, and is calculated based on the volume of the combustion chamber, the cross-sectional area of the piston 3d, the crank angle CA, the length of a connecting rod, and the crank length of the crankshaft 3c. The intake air amount QA(n) is calculated based on the engine speed NE(n) and the intake pipe pressure PBA. It should be noted that the symbol n represents a discretized time, and discrete data with the symbol (n) indicates that it is data calculated or sampled in timing synchronous with generation of each pulse of the CRK signal. This also applies to discrete data (time-series data) referred to hereinafter. Further, in the following, the symbol (n) is omitted as deemed appropriate.

Then, a provisional value PCYLFM is calculated (step 2). Specifically, first, the output DPV from the in-cylinder pressure sensor 11 is integrated by a charger amplifier, and then a basic provisional value PCYLT is calculated e.g. by eliminating temperature-dependent noise from the integral value. Next, a provisional value PCYLFM is calculated by correcting the basic provisional value PCYLT as follows. In the present embodiment, the provisional value PCYLFM corresponds to a detected in-cylinder pressure.

This correction is performed so as to correct the difference between the basic provisional value PCYLT and an actual in-cylinder pressure, which is caused by the aging of the in-cylinder pressure sensor 11. The basic provisional value PCYLT is corrected from the following viewpoint: During a period from the start of the compression stroke to a time point immediately before ignition (hereinafter referred to as "the non-combustion compression period"), combustion is not performed, and therefore the motoring pressure PCYLMDLK is held equal to the actual in-cylinder pressure. Further, during the non-combustion compression period, since compression of the volume Vc of the cylinder 3a by the piston 3d causes the in-cylinder pressure to change more sharply than in the intake stroke and the exhaust stroke, during which combustion is not performed, either, the difference of the basic provisional value PCYLT from the actual in-cylinder pressure becomes clear. For these reasons, the correction of the basic provisional value PCYLT is performed using a PCYLT value and a PCYLMDLK value obtained during the non-combustion compression period.

The relationship between the basic provisional value PCYLT(n) and an identified value PCYLT_HAT(n) can be defined by the following equation (1). The identified value PCYLT_HAT(n) represents a PCYLT value obtained by correcting the difference caused by the aging of the in-cylinder pressure sensor 11. First, during the non-combustion compression period, a vector θ(n) of model parameters K1(n) and C1(n) of the equation (1) is identified by an sequential least-squares method expressed by the following equations (2) to (8):

$$PCYLT\_HAT(n) = K1(n) \cdot PCYLT(n) + C1(n) \quad (1)$$

$$\theta(n) = \theta(n-1) + KP(n) \cdot ide(n) \quad (2)$$

$$\theta(n)^T = [K1(n) C1(n)] \quad (3)$$

$$ide(n) = PCYLT\_HAT(n) - PCYLMDLK(n) \quad (4)$$

$$PCYLT\_HAT(n) = \theta(n-1)^T \cdot \zeta(n) \quad (5)$$

$$\zeta(n)^T = [PCYLT(n) 1] \quad (6)$$

$$KP(n) = \frac{P(n) \cdot \zeta(n)}{1 + \zeta(n)^T \cdot P(n) \cdot \zeta(n)} \quad (7)$$

-continued $$P(n+1) = \frac{1}{\lambda_1} \cdot \left( I - \frac{\lambda_2 \cdot P(n) \cdot \zeta(n) \cdot \zeta(n)^T}{\lambda_1 + \lambda_2 \cdot \zeta(n)^T \cdot P(n) \cdot \zeta(n)} \right) \cdot P(n) \quad (8)$$

$I$: UNIT MATRIX
$\lambda_1, \lambda_2$: WEIGHT PARAMETER

In the equation (2), KP(n) represents a vector of a gain coefficient, and ide(n) represents an identification error. $\theta(n)^T$ in the equation (3) represents a transposed matrix of the vector θ(n). The identification error ide(n) in the equation (2) is calculated by the equation (4), and ζ(n) in the equation (5) represents a vector the transposed matrix of which is represented by the equation (6). Further, the vector KP(n) of the gain coefficient is calculated by the equation (7). P(n) in the equation (7) represents a square matrix of order 2 defined by the equation (8). Weight parameters λ1 and λ2 in the equation (8) are set to 1.

The vector θ(n) is calculated with the algorithm expressed by the equations (2) to (8) such that the identification error ide(n) is minimized. More specifically, the vector θ(n) is identified such that the identified value PCYLT_HAT(n) becomes equal to the motoring pressure PCYLMDLK(n). It should be noted that at the start of the engine 3, the immediately preceding value θ(n−1) of the vector θ(n), which is used e.g. in the equation (2), is set to a predetermined value.

Then, the obtained parameters K1(n) and C1(n) are learned, and the basic provisional value PCYLT(n) is corrected by the following equation (9), based on the learned parameters K1(n) and C1(n):

$$PCYLFM(n) = K1(n) \cdot PCYLT(n) + C1(n) \quad (9)$$

It should be noted that during a period from the end of the current non-combustion compression period to the start of the next identification of the vector θ(n), the model parameters K1(n) and C1(n) eventually obtained during the current non-combustion compression period is used for calculation of the provisional value PCYLFM.

As described hereinbefore, during the non-combustion compression period, the motoring pressure PCYLMDLK is equal to the actual in-cylinder pressure, and the model parameters K1(n) and C1(n) shown in the equation (1) are obtained such that the identified value PCYLT_HAT becomes equal to the PCYLMDLK value. In other words, the K1 value and the C1 value are calculated such that the PCYLT_HAT value becomes equal to the actual in-cylinder pressure. Therefore, the provisional value PCYLFM can be accurately calculated as a value indicative of the in-cylinder pressure by the equation (9) in which the provisional value PCYLFM is substituted for the PCYLT_HAT value in the equation (1).

Then, it is determined whether or not a hysteresis correction execution flag F_HYS is equal to 1 (step 3). As will be described in detail hereinafter, this hysteresis correction execution flag F_HYS is set to 1 during execution of correction of a hysteresis amount contained in the provisional value PCYLFM. If the answer to this question is negative (NO), it is determined whether or not it is time for the in-cylinder pressure to start decreasing (step 4). This step is carried out so as to determine whether or not the provisional value PCYLFM has started decreasing for the first time after the start of the expansion stroke. Specifically, a time at which the difference between the current value of the provisional value PCYLFM and the immediately preceding value of the same changes from positive to negative is determined as decrease start time.

If the answer to this question is negative (NO), the final in-cylinder pressure PCYLF is set to the provisional value PCYLFM calculated in the step 2 (step 17 in FIG. 3), followed by terminating the present process. On the other hand, if the answer to the question of the step 4 is affirmative (YES), i.e. if it is the decrease start time, the current crank angle CA is set to a decrease start angle itdc (step 5), and then the hysteresis correction execution flag F_HYS is set to 1 (step 6) so as to start hysteresis correction, followed by the process proceeding to a step 7 in FIG. 3. By executing of the step 6, the answer to the question of the step 3 becomes affirmative (YES), and in this case the process skips the steps 4 to 6 over to the step 7.

In the step 7, it is determined whether or not it is time for completion of the exhaust stroke. In this step, when the crank angle CA is equal to 720 degrees, it is determined that it is time for completion of the exhaust stroke. If the answer to the question of the step 7 is negative (NO), the motoring pressure PCYLMDLK and the provisional value PCYLFM calculated in the respective steps 1 and 2 are stored in association with the crank angle CA (steps 8 and 9), followed by terminating the present process.

On the other hand, if the answer to the question of the step 7 is affirmative (YES), i.e. if it is time for completion of the exhaust stroke, a plurality of PCYLMDLK values obtained in a predetermined average value calculation section INTCA are read out from numerous PCYLMDLK values stored by executing the step 8, and the average value of the read-out PCYLMDLK values is calculated as an average motoring pressure PMAVE (step 10). The average value calculation section INTCA is defined by a predetermined first angle CA1 before the start time (IPCYLHYS) of the exhaust stroke and a predetermined second angle CA2 after the start time IPCYLHYS (see FIG. 4). In the present embodiment, the average motoring pressure PMAVE corresponds to a motoring pressure obtained during the exhaust stroke.

Then, a plurality of PCYLFM values obtained during the average value calculation section INTCA are read out from numerous PCYLFM values stored by executing the step 9, and the average value of the PCYLFM values obtained in the average value calculation section INTCA is calculated as an average provisional value PFAVE (step 11). In the present embodiment, the average provisional value PFAVE corresponds to a detected in-cylinder pressure obtained during the exhaust stroke.

Next, the average motoring pressure PMAVE is subtracted from the calculated average provisional value PFAVE to thereby calculate a reference hysteresis amount PCYLHYSM (step 12). In the present embodiment, this reference hysteresis amount PCYLHYSM corresponds to a comparison result parameter.

Then, a weighting coefficient KHYS is calculated based on the decrease start angle itdc set in the step 5 (step 13) by the following equation (10):

$$KHYS(CA) = (CA - itdc)/(IPCYLHYS - itdc) \quad (10)$$

wherein IPCYLHYS represents a crank angle CA at the start of the exhaust stroke (hereinafter referred to as "the exhaust stroke start angle"), i.e. the angle IPCYLHYS is equal to 540 degrees. As shown in the equation (10), the weighting coefficient KHYS is calculated as the ratio between the length (CA−itdc) of a section from the decrease start angle itdc to an arbitrary crank angle CA and the length (IPCYLHYS−itdc) of a section from the decrease start angle itdc to the exhaust stroke start angle IPCYLHYS. In the present embodiment, the exhaust stroke start angle IPCYLHYS corresponds to a predetermined time during the exhaust stroke.

The calculation of the weighting coefficient KHYS is performed in association with the crank angle CA as it changes from the decrease start angle itdc to the exhaust stroke start angle IPCYLHYS, whereby the weighting coefficient KHYS from the decrease start time to the exhaust stroke start time is calculated on a crank angle-by-crank angle basis, and the obtained KHYS values are stored in association with the respective crank angles CA. In the present embodiment, the weighting coefficient KHYS corresponds to the weight of the comparison result parameter for the hysteresis amount.

Next, the hysteresis amount PCYLHYS is calculated using the weighting coefficient KHYS and the weighting coefficient KHYS calculated in the respective steps 12 and 13 (step 14), by the following equation (10):

$$PCYLHYS(CA) = PCYLHYSM \cdot KHYS(CA) \quad (11)$$

The hysteresis amount PCYLHYS from the decrease start time to the exhaust stroke start time is calculated on a crank angle-by-crank angle basis by the equation (11). Further, the hysteresis amount PCYLHYS from a time immediately after the start of the exhaust stroke to the end of the exhaust stroke is unconditionally set to the reference hysteresis amount PCYLHYSM. The obtained PCYLHYS values are stored in association with the respective crank angles CA.

Then, the final in-cylinder pressure PCYLF is calculated using the provisional value PCYLFM and the hysteresis amount PCYLHYS for each crank angle CA changing from the decrease start time to the end of the exhaust stroke (step 15), by the following equation (12):

$$PCYLF(CA) = PCYLFM(CA) - PCYLHYS(CA) \quad (12)$$

Next, the hysteresis correction execution flag F_HYS is set to 0 (step 16) so as to terminate the hysteresis correction, followed by terminating the present process.

As described above, the hysteresis correction is performed for each provisional value PCYLFM obtained during the period from the decrease start time to the end of the exhaust stroke, whereby the final in-cylinder pressure PCYLF is calculated by correcting the provisional value PCYLFM according to the hysteresis for this period (step 15). Further, in the other crank angle sections, i.e. during a period from the start of the intake stroke to the decrease start time, the final in-cylinder pressure PCYLF is set to the provisional value PCYLFM without correction (step 17).

Figure 4:
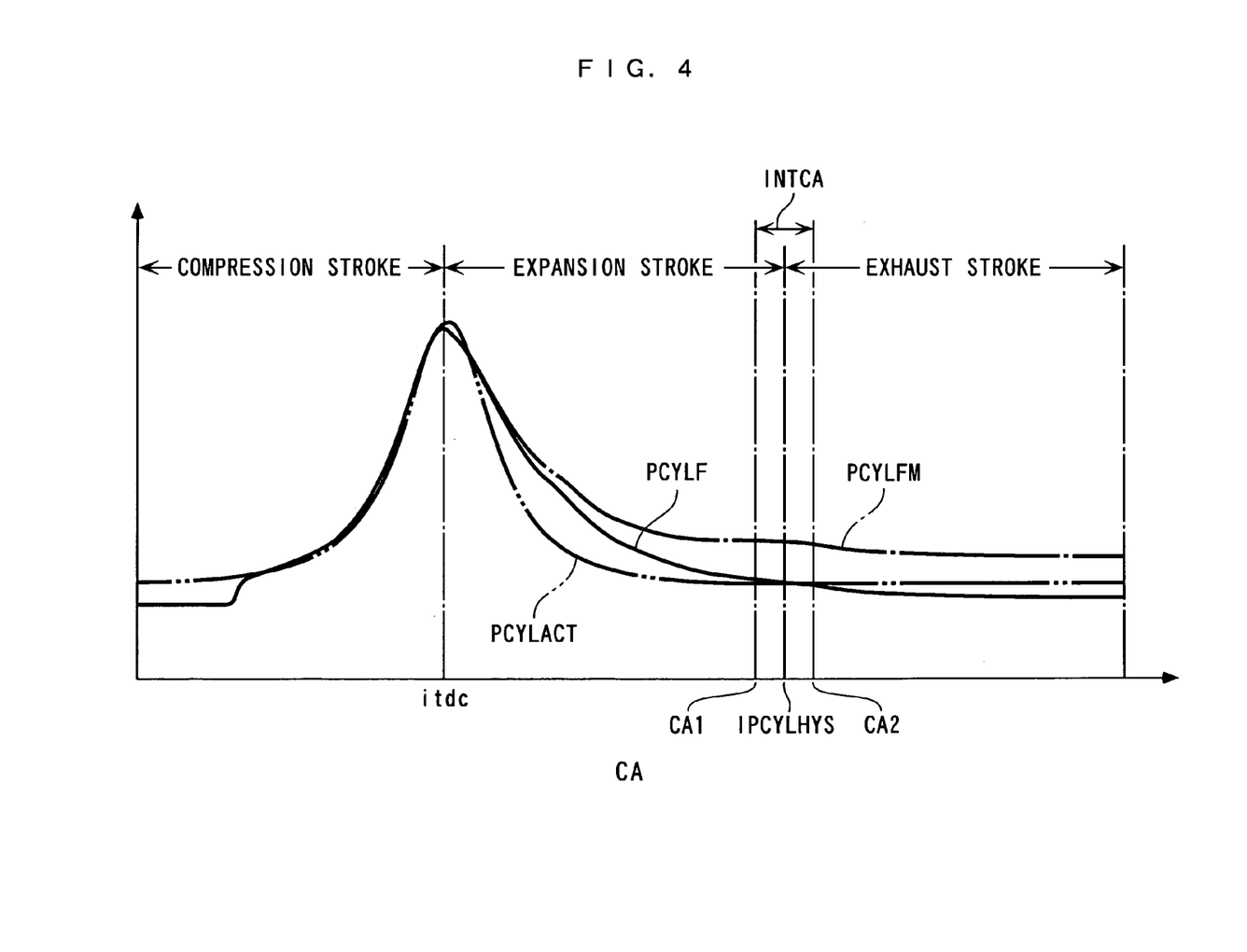
FIG. 4 is a diagram showing an example of changes in the final in-cylinder pressure and associated pressure values, which are calculated during an F/C operation by the process shown in FIGS. 2 and 3.

FIG. 4 shows an example of changes in the final in-cylinder pressure PCYLF and associated pressure values, which are calculated during the F/C operation. As shown in FIG. 4, an actual in-cylinder pressure PCYLACT is maximum at the end of the compression stroke, then sharply decreases during the expansion stroke, and keeps substantially constant from the start of the exhaust stroke to the end of the same. The provisional value PCYLFM is not corrected by the hysteresis amount PCYLHYS during the period from the decrease start time indicated by the decrease start angle itdc to the end of the exhaust stroke, and hence the provisional value PCYLFM is considerably larger than the actual in-cylinder pressure PCYLACT.

In contrast, the final in-cylinder pressure PCYLF is closer to the actual in-cylinder pressure PCYLACT than the provisional value PCYLFM is to the same, over the period from the decrease start time to the end of the exhaust stroke.

As described above, according to the present embodiment, the reference hysteresis amount PCYLHYSM is calculated as the difference between the provisional value PCYLFM and the monitoring pressure PCYLMDLK obtained during the exhaust stroke (step 12). Further, the weighting coefficient KHYS is calculated as the ratio of the length of a section from the decrease start angle itdc to an arbitrary crank angle CA to the length of a section from the decrease start angle itdc to the exhaust stroke start angle IPCYLHYS (hereinafter referred to as "the section length ratio") (step 13). Then, the hysteresis amount PCYLHYS from the decrease start time to the start of the exhaust stroke is calculated by multiplying the reference hysteresis amount PCYLHYSM by the weighting coefficient KHYS (step 14). Therefore, during the period from the decrease start time to the start of the exhaust stroke, it is possible to accurately calculate the hysteresis amount PCYLHYS such that it matches actual changing characteristics. Further, since the weighting coefficient KHYS is calculated as the section length ratio, it is possible to easily calculate the hysteresis amount PCYLHYS.

As shown in FIG. 4, during the exhaust stroke, the actual hysteresis amount tends to keep substantially constant. According to the present embodiment, during the period from the start of the exhaust stroke to the end of the same, the hysteresis amount PCYLHYS is unconditionally set to the reference hysteresis amount PCYLHYSM (step 14), so that a highly accurate PCYLHYS value can be obtained with ease. Thus, during the period from the decrease start time to the end of the exhaust stroke, it is possible to obtain a highly accurate PCYLHYS value.

Further, since the provisional value PCYLFM is corrected by the calculated hysteresis amount PCYLHYS during the period from the decrease start time to the end of the exhaust stroke to thereby calculate the final in-cylinder pressure PCYLF (step 15), it is possible to obtain a highly accurate PCYLF value.

Furthermore, since the reference hysteresis amount PCYLHYSM is calculated based on the average provisional value PFAVE as the average value of a plurality of PCYLFM values and the average motoring pressure PMAVE as the average value of a plurality of PCYLMDLK pressures (steps 10 to 12), it is possible to more accurately calculate the hysteresis amount PCYLHYS while suppressing influence of noise contained in the output DPV from the in-cylinder pressure sensor 11.

Next, a description will be given of a first variation of the process for calculating the final in-cylinder pressure PCYLF. In this first variation, calculation of the weighting coefficient KHYS in the step 13 is performed not by the equation (10), but by the following equation (13):

$$KHYS(CA)=\{(CA-itdc)/(IPCYLHYS-itdc)\}^{1/a} \qquad (13)$$

wherein a represents a predetermined value.

As is apparent from the equation (13), the weighting coefficient KHYS is calculated as the radical root of the section length ratio (CA−itdc)/(IPCYLHYS−itdc).

Figure 5:
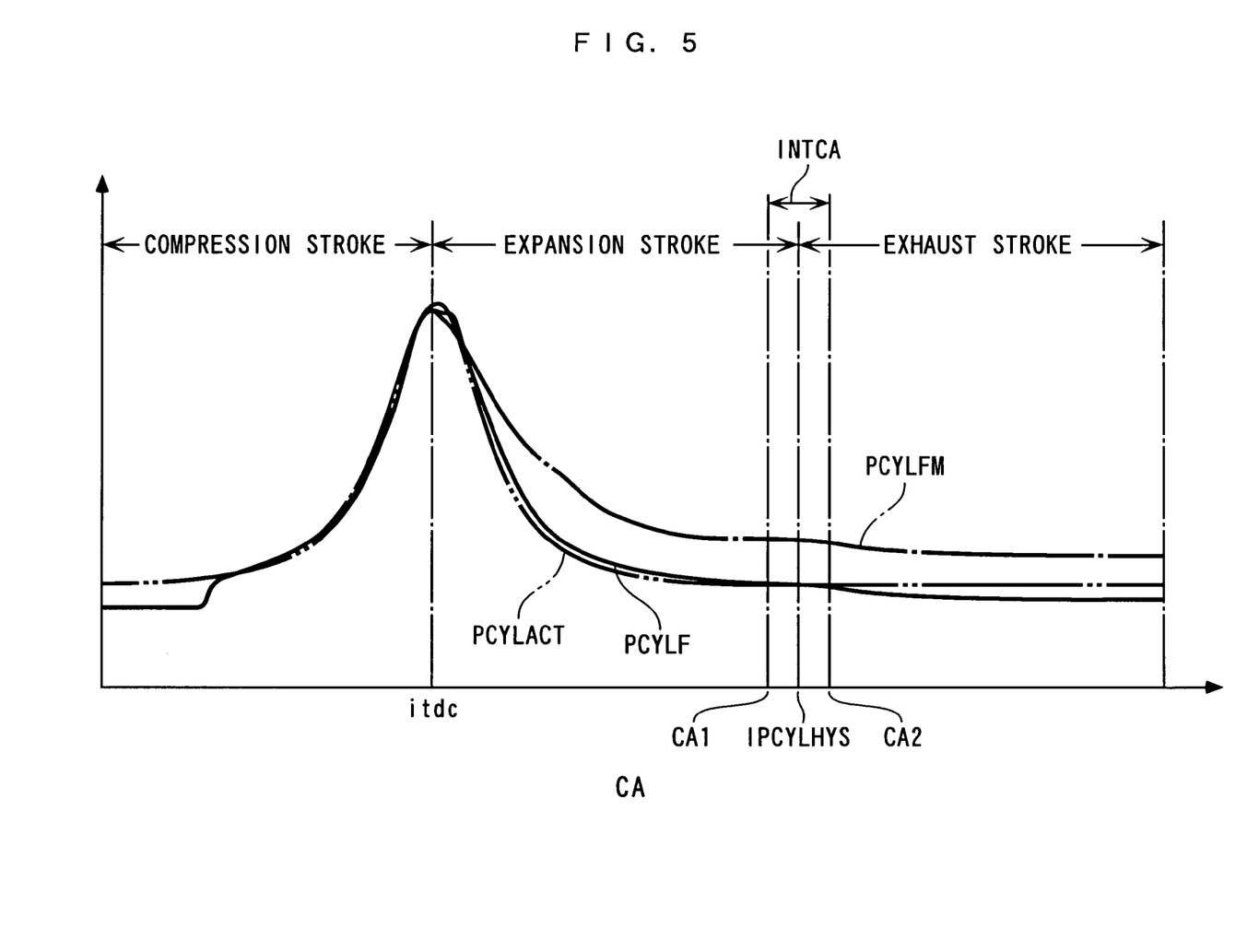
FIG. 5 is a diagram showing an example of changes in the final in-cylinder pressure and associated pressure values, which are calculated during the F/C operation, according to a first variation of the first embodiment.

FIG. 5 shows an example of changes in the final in-cylinder pressure PCYLF and associated pressure values, which are calculated during the F/C operation. As shown in FIG. 5, during the period from the decrease start time to the end of the exhaust stroke, the final in-cylinder pressure PCYLF is substantially equal to the actual in-cylinder pressure PCYLACT with little error, and therefore its accuracy is extremely high.

According to the first variation, since the weighting coefficient KHYS is thus calculated, it is possible to obtain the weighting coefficient KHYS such that it more properly matches the actual changing characteristics of the hysteresis amount PCYLHYS, thereby calculating the hysteresis amount PCYLHYS with higher accuracy.

Further, the rise of the hysteresis amount PCYLHYS in an easily stage after the start of decrease of the in-cylinder pressure can be changed by setting the predetermined value a in a different manner, so that by setting the predetermined value a as deemed appropriate, it is possible to obtain a hysteresis amount PCYLHYS even more properly matching actual changing characteristics.

Next, a description will be given of a second variation of the process for calculating the final in-cylinder pressure PCYLF. In this second variation, calculation of the weighting coefficient KHYS in the step 13 is performed not by the equation (10), but by the following equation (14):

$$KHYS(CA)=\{PCYLMDLK(itdc)-PCYLMDLK(CA)\}/ \\ \{PCYLMDLK(itdc)-PCYLMDLK(IPCYLHYS)\} \qquad (14)$$

As is apparent from the equation (14), the weighting coefficient KHYS is calculated as the ratio of the amount of decrease (PCYLMDLK(itdc)−PCYLMDLK(CA)) in the motoring pressure PCYLMDLK from the decrease start angle itdc to an arbitrary crank angle CA and the amount of decrease (PCYLMDLK(itdc)−PCYLMDLK(IPCYLHYS)) in the motoring pressure PCYLMDLK from the decrease start angle itdc to the exhaust stroke start angle IPCYLHYS.

Figure 6:
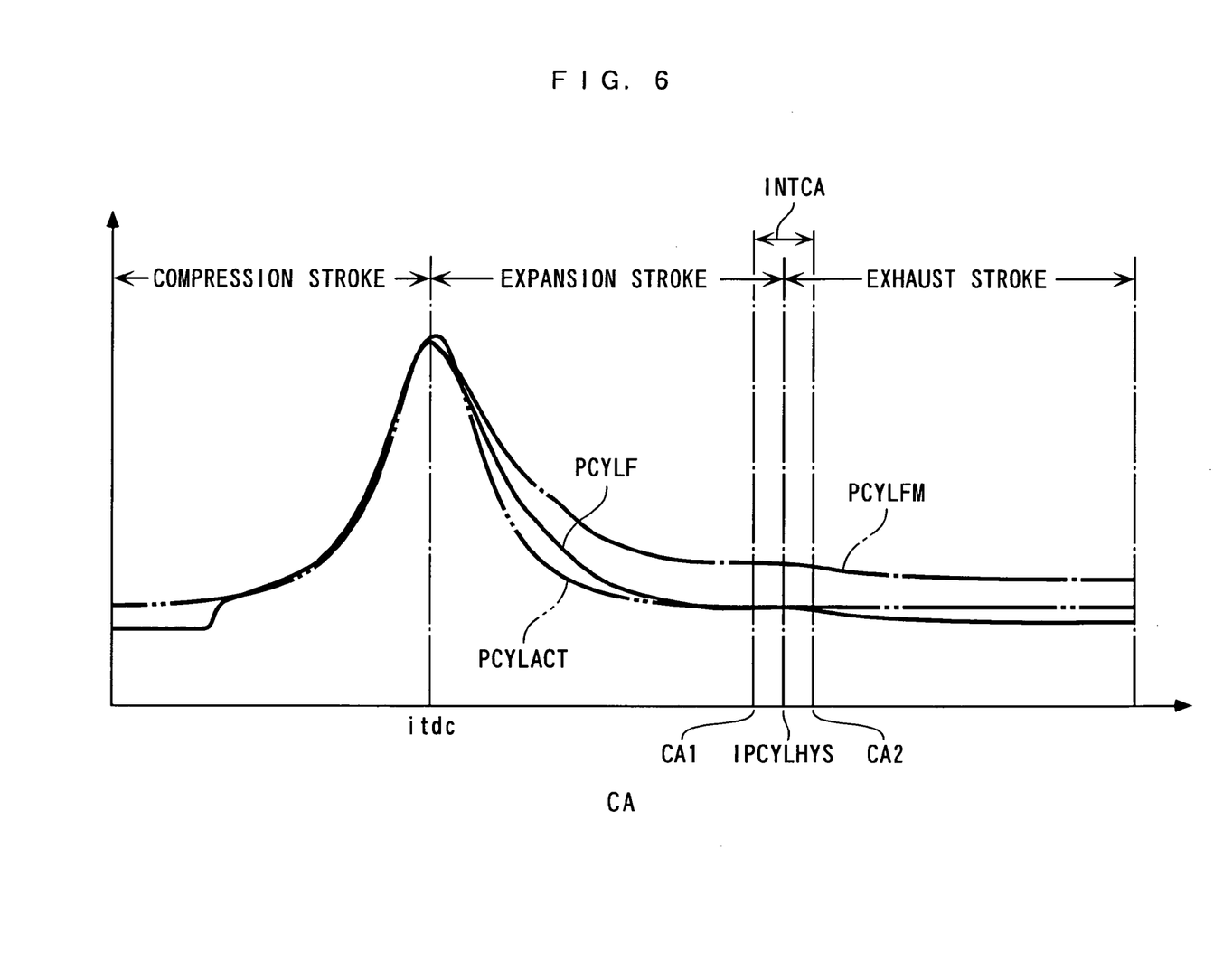
FIG. 6 is a diagram showing an example of changes in the final in-cylinder pressure and associated pressure values, which are calculated during the F/C operation, according to a second variation of the first embodiment.

FIG. 6 shows an example of changes in the final in-cylinder pressure PCYLF and associated pressure values, which are calculated during the F/C operation. As shown in FIG. 6, during the period from the decrease start time to the end of the exhaust stroke, the final in-cylinder pressure PCYLF is close to the actual in-cylinder pressure PCYLACT.

According to the second variation, since the weighting coefficient KHYS is calculated as described above, it is possible to utilize an analogy between reduction characteristics of the motoring pressure PCYLMDLK in the expansion stroke and the changing characteristics of the weighting coefficient KHYS to determine the weighting coefficient KHYS such that it more properly matches the actual changing characteristics of the hysteresis amount PCYLHYS, and thereby calculate the hysteresis amount PCYLHYS with higher accuracy. Further, since the motoring pressure PCYLMDLK originally calculated so as to obtain the reference hysteresis amount PCYLHYSM can be used without any processing, it is possible to reduce computation load on the ECU 2.

Next, a second embodiment of the present invention will be described with reference to FIGS. 7 to 9. The present embodiment is distinguished from the above-described first embodiment in that the hysteresis amount PCYLHYS is learned, and then hysteresis correction is performed using the learned hysteresis amount PCYLHYS.

Figure 7:
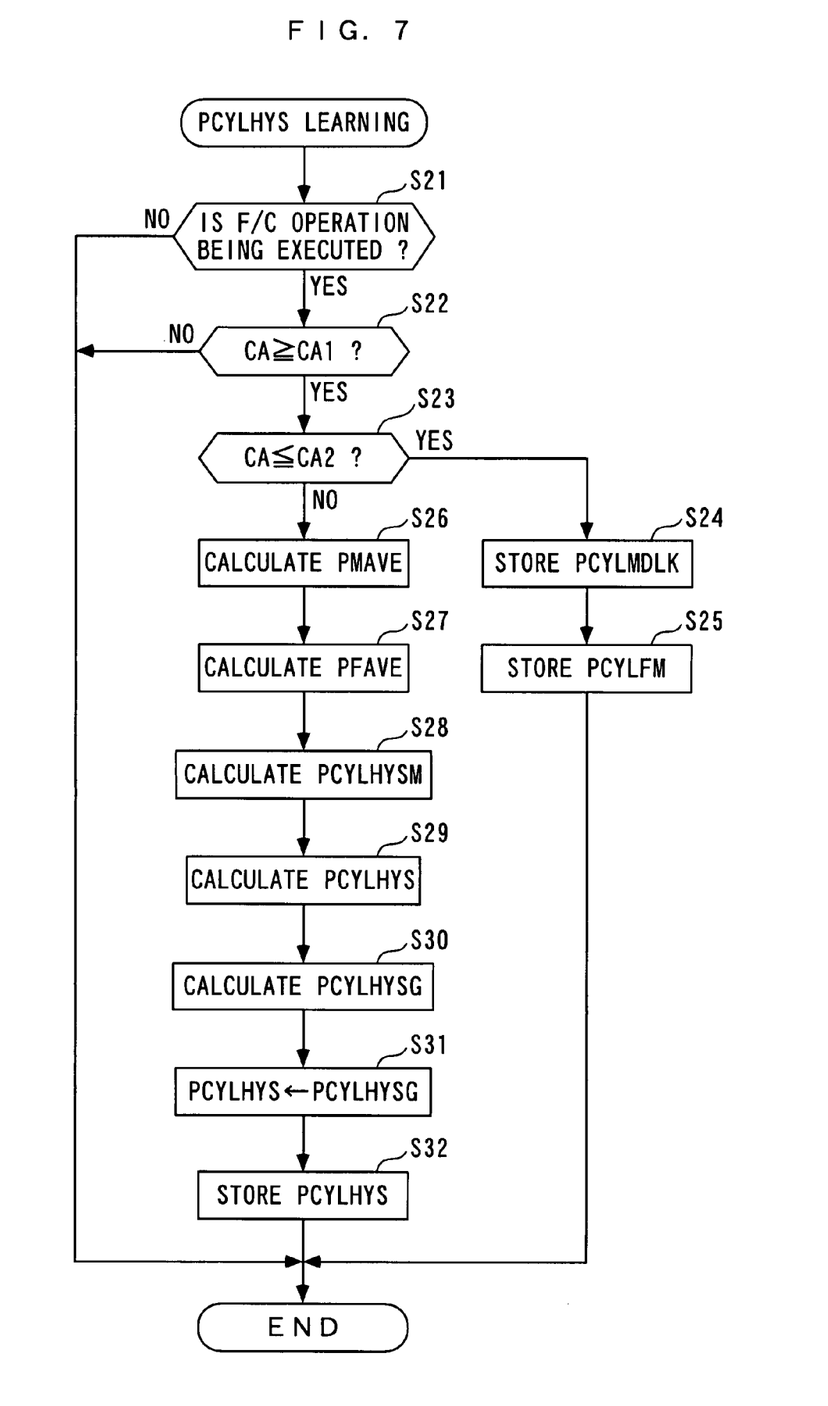
FIG. 7 is a flowchart of a process for learning a hysteresis amount, according to a second embodiment of the present invention.

FIG. 7 shows a process for learning the hysteresis amount PCYLHYS. First, it is determined in a step 21 whether or not F/C operation is being executed. If the answer to the question is negative (NO), i.e. if F/C operation is not being executed, the present process is immediately terminated, whereas if F/C operation is being executed, it is determined whether the crank angle CA is not smaller than the aforementioned first angle CA1 (step 22). If the answer to the question of the step 22 is negative (NO), the present process is immediately terminated, whereas if the answer to the question is affirmative (YES), it is determined whether the crank angle CA is not larger than the aforementioned second angle CA2 (step 23).

If the answer to the question of the step 23 is affirmative (YES), i.e. if the crank angle CA is within the average value calculation section INTCA, the present motoring pressure PCYLMDLK and the present provisional value PCYLFM are stored in respective steps 24 and 25, followed by terminating the present process. Whenever the steps 24 and 25 are executed, a motoring pressure PCYLMDLK and a provisional value PCYLFM in an associated loop are stored in respective different storage areas in a RAM of the ECU 2.

On the other hand, if the answer to the question of the step 23 is negative (NO), i.e. if CA>CA2 holds, it is judged that storage of the motoring pressure PCYLMDLK and the provisional value PCYLFM in the entire average value calculation section INTCA is completed, and in steps 26 to 28, the average motoring pressure PMAVE, the average provisional value PFAVE, and the reference hysteresis amount PCYLHYSM are calculated, respectively, as in the steps 10 to 12.

Then, the hysteresis amount PCYLHYS is calculated (step 29). This calculation is performed, differently from the calculation in the first embodiment, by reading out a PCYLHYS value associated with the present engine speed NE and the present intake pipe pressure PBA from a PCYLHYS memory. This PCYLHYS value is learned and stored/updated as described hereinafter. The PCYLHYS memory is implemented by an EEPROM 2a, and has numerous storage areas each defined in association with a combination of each of predetermined values of the engine speed NE and each of predetermined values of the intake pipe pressure PBA. PCYLHYS values are stored in these storage areas according to the engine speed NE and the intake pipe pressure PBA. It should be noted that in calculating the PCYLHYS value, no hysteresis amount PCYLHYS corresponding to the present engine speed NE and the present intake pipe pressure PBA exists, the PCYLHYS value is calculated by interpolation.

Figure 8:
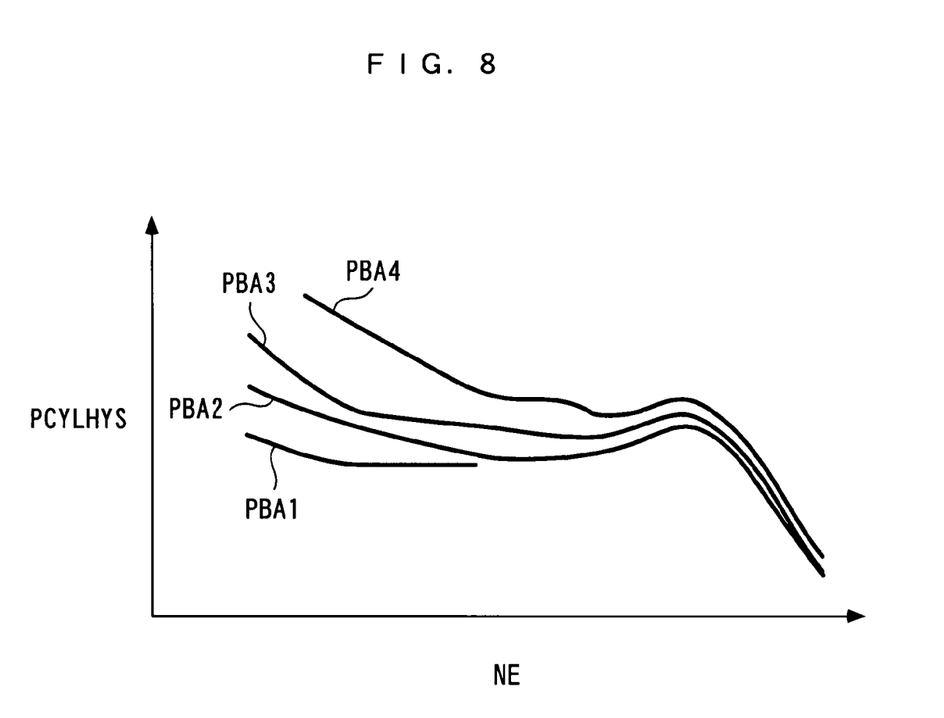
FIG. 8 is a diagram showing a tendency of the hysteresis amount stored in a memory.
Figure 9:
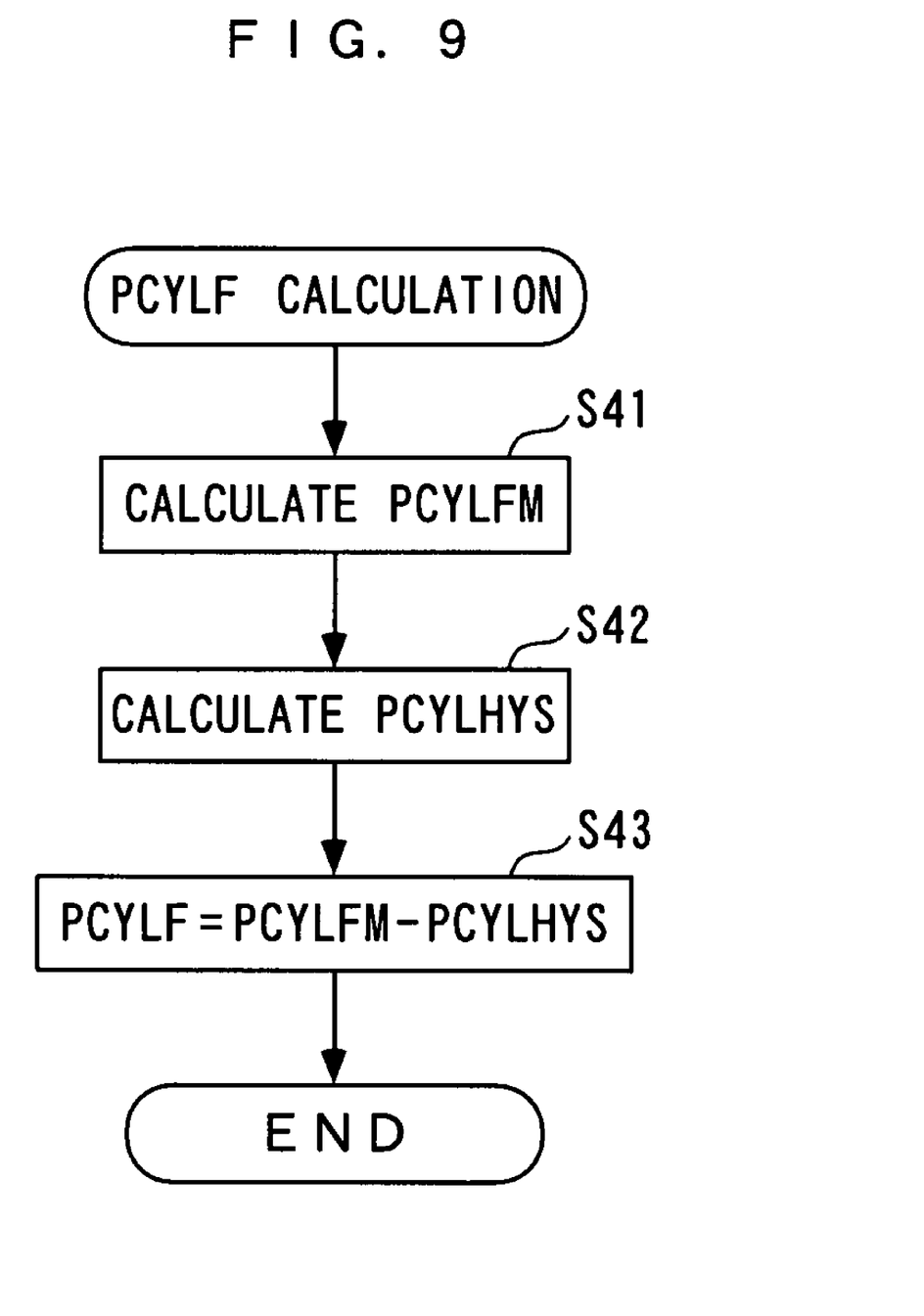
FIG. 9 is a flowchart of a process for calculating the final in-cylinder pressure, according to the second embodiment.

FIG. 8 shows the relationship between the hysteresis amount PCYLHYS stored in the PCYLHYS memory and the engine speed NE and the intake pipe pressure PBA. In FIG. 8, reference numerals PBA1 to PBA4 designate respective predetermined values (PBA1<PBA2<PBA3<PBA4). As shown in FIG. 8, the PCYLHYS value is set to a larger value as the engine speed NE is lower and the intake pipe pressure PBA is higher. This is because as the engine speed NE is lower, pressure is more liable to remain on a screw part of the spark plug 4, which makes the hysteresis amount PCYLHYS larger. Further, as the intake pipe pressure PBA is higher, the maximum value of the in-cylinder pressure during one combustion cycle becomes larger, and accordingly, the pressure remaining on the screw part of the spark plug 4 also becomes higher.

Next, a learned value PCYLHYSG of the hysteresis amount PCYLHYS is calculated using the reference hysteresis amount PCYLHYSM and the hysteresis amount PCYLHYS calculated in the respective steps 28 and 29 (step 30), by the following equation (15):

$$PCYLHYSG = K \cdot PCYLHYSM + (1-K) \cdot PCYLHYS \qquad (15)$$

wherein K represents a predetermined learning coefficient (0<K<1).

Then, the hysteresis amount PCYLHYS is set to the calculated learned value PCYLHYSG (step 31), whereby the hysteresis amount PCYLHYS is learned. Then, the learned hysteresis amount PCYLHYS is stored in a storage area defined in the PCYLHYS memory in association with the present engine speed NE and intake pipe pressure PBA (step 32), followed by terminating the present process. Thus, the hysteresis amount PCYLHYS is updated. It should be noted that when the present engine speed NE and the present intake pipe pressure PBA do not match with any combination of NE and PBA, the learned PCYLHYS value is stored in a storage area for a combination of predetermined values closest to the respective present values of the engine speed NE and the intake pipe pressure PBA.

Next, a process for calculating the final in-cylinder pressure PCYLF will be described with reference to FIG. 9. First, in a step 41, the provisional value PCYLFM is calculated as in the step 2. Then, as in the step 29, the hysteresis amount PCYLHYS is calculated by reading out a PCYLHYS value associated with the present engine speed NE and the present intake pipe pressure PBA from the PCYLHYS memory (step 42). Next, the final in-cylinder pressure PCYLF is calculated by subtracting the hysteresis amount PCYLHYS from the calculated provisional value PCYLFM (step 43), followed by terminating the present process.

The calculation of the hysteresis amount PCYLHYS in the step 42 and the correction of the provisional value PCYLFM in the step 43 are performed during the period from the decrease start time to the end of the exhaust stroke, and in the other crank angle section, the final in-cylinder pressure PCYLF is set to the provisional value PCYLFM as in the step 17. Further, in the step 43, the final in-cylinder pressure PCYLF calculated at each time instead of collectively calculating a plurality of PCYLF values during the period from the decrease start time to the end of the exhaust stroke, as in the step 16.

As described above, according to the present embodiment, the reference hysteresis amount PCYLHYSM is calculated during the F/C operation (step 28), and the hysteresis amount PCYLHYS is learned based on the calculated reference hysteresis amount PCYLHYSM (steps 30 and 31). This makes it possible to learn the hysteresis amount PCYLHYS properly without being influenced by a pressure generated by combustion. Further, since the final in-cylinder pressure PCYLF is calculated by correcting the provisional value PCYLFM using the learned hysteresis amount PCYLHYS (step 43), it is possible to obtain a highly accurate final in-cylinder pressure PCYLF.

It should be noted that the present invention is by no means limited to the above-described embodiments, but it can be practiced in various forms. For example, although in the first embodiment, the hysteresis amount PCYLHYS is calculated by multiplying the reference hysteresis amount PCYLHYSM by the weighting coefficient KHYS, this is not limitative but the PCYLHYS value may be unconditionally set to the reference hysteresis amount PCYLHYSM. Further, although in the first embodiment, in calculation of the weighting coefficient KHYS, the length of a period between the decrease start time and a predetermined time during the exhaust stroke and the length of a period between the decrease start time and an arbitrary time are represented by respective degrees of the crank angle CA, this is not limitative but they may be represented by time.

Furthermore, although in the above-described embodiments, the comparison result parameter is calculated as the difference between the average provisional value PFAVE and the average motoring pressure PMAVE, this is not limitative but the parameter may be calculated as the ratio between the PFAVE value and the PMAVE value, the difference between a PCYLFMF value and a PCYLMDLK value obtained in predetermined timing during the exhaust stroke, or the ratio between the PCYLFMF value and the PCYLMDLK value. Moreover, as a time for starting calculation of the hysteresis amount PCYLHYS, the time of generation of a TDC signal pulse at the start of the expansion stroke may be used in place of the decrease start time.

Although in the above-described embodiments, the present invention is applied to the automotive gasoline engine by way of example, this is not limitative, but it can be applied to various types of engines, such as diesel engines and engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. An in-cylinder pressure detection device for an internal combustion engine, for detecting in-cylinder pressure defined as pressure within a cylinder of the engine, comprising:
    an in-cylinder pressure sensor that detects an in-cylinder pressure as a detected in-cylinder pressure;
    motoring pressure-estimating means for estimating the in-cylinder pressure generated when combustion is not performed in the cylinder, as a motoring pressure;
    hysteresis amount-calculating means for calculating a hysteresis amount indicative of a difference between the detected in-cylinder pressure and an actual in-cylinder pressure, based on the detected in-cylinder pressure and the motoring pressure obtained during an exhaust stroke of the engine; and
    correction means for correcting the detected in-cylinder pressure based on the calculated hysteresis amount.

2. An in-cylinder pressure detection device as claimed in claim 1, wherein said hysteresis amount-calculating means comprises comparison result parameter-calculating means for calculating a comparison result parameter indicative of a result of comparison between the detected in-cylinder pressure and the motoring pressure, and calculates the hysteresis amount based on the calculated comparison result parameter.

3. An in-cylinder pressure detection device as claimed in claim 2, wherein said comparison result parameter-calculating means calculates the comparison result parameter based on the detected in-cylinder pressure and the motoring pressure obtained at a predetermined time during the exhaust stroke, and
    wherein said hysteresis amount-calculating means further comprises decrease start time-detecting means for detecting a decrease start time at which the in-cylinder pressure starts decreasing after start of an expansion stroke of the engine, and weight-calculating means for calculating a weight of the comparison result parameter for the hysteresis amount at an arbitrary time between the decrease start time and the predetermined time according to a period length ratio between a length of a period from the decrease start time to the arbitrary time and a length of a period from the decrease start time to the predetermined time, and calculates the hysteresis amount at the arbitrary time, using the calculated weight and the comparison result parameter.

4. An in-cylinder pressure detection device as claimed in claim 3, wherein said weight-calculating means calculates the weight such that the weight is proportional to the period length ratio.

5. An in-cylinder pressure detection device as claimed in claim 3, wherein said weight-calculating means calculates the weight such that the weight is proportional to a radical root of the period length ratio.

6. An in-cylinder pressure detection device as claimed in claim 2, wherein said comparison result parameter-calculating means calculates the comparison result parameter based on the detected in-cylinder pressure and the motoring pressure obtained at a predetermined time during the exhaust stroke, and
    wherein said hysteresis amount-calculating means further comprises decrease start time-detecting means for detecting a decrease start time at which the in-cylinder pressure starts decreasing after start of an expansion stroke of the engine, and weight-calculating means for calculating a weight of the comparison result parameter for the hysteresis amount at an arbitrary time between the decrease start time and the predetermined time, according to a ratio between a difference between the motoring pressure at the decrease start time and the motoring pressure at the arbitrary time and a difference between the motoring pressure at the decrease start time and the motoring pressure at the predetermined time, and calculates the hysteresis amount at the arbitrary time, using the calculated weight and the comparison result parameter.

7. An in-cylinder pressure detection device as claimed in claim 2, wherein the engine is configured to carry out fuel cut-off operation for cutting off supply of fuel to the engine when predetermined conditions are satisfied,
    the in-cylinder pressure detection device further comprising fuel cut-off determination means for determining whether or not the fuel cut-off operation is being carried out, and
    wherein said hysteresis amount-calculating means calculates the hysteresis amount based on the comparison result parameter calculated during the fuel cut-off operation.

8. An engine control unit including a control program for causing a computer to detect in-cylinder pressure defined as pressure within a cylinder of an internal combustion engine,
    wherein the control program causes the computer to detect an in-cylinder pressure as a detected in-cylinder pressure, estimate the in-cylinder pressure generated when combustion is not performed in the cylinder, as a motoring pressure, calculate a hysteresis amount indicative of a difference between the detected in-cylinder pressure and an actual in-cylinder pressure, based on the detected in-cylinder pressure and the motoring pressure obtained during an exhaust stroke of the engine, and correct the detected in-cylinder pressure based on the calculated hysteresis amount.

9. A engine control unit as claimed in claim 8, wherein when causing the computer to calculate the hysteresis amount, the control program causes the computer to calculate a comparison result parameter indicative of a result of comparison between the detected in-cylinder pressure and the motoring pressure, and the control program causes the computer to calculate the hysteresis amount based on the calculated comparison result parameter.

10. A engine control unit as claimed in claim 9, wherein when causing the computer to calculate the comparison result parameter, the control program causes the computer to calculate the comparison result parameter based on the detected in-cylinder pressure and the motoring pressure obtained at a predetermined time during the exhaust stroke, and
    wherein when causing the computer to calculate the hysteresis amount, the control program causes the computer to detect a decrease start time at which the in-cylinder pressure starts decreasing after start of an expansion stroke of the engine, and calculate a weight of the comparison result parameter for the hysteresis amount at an arbitrary time between the decrease start time and the predetermined time according to a period length ratio between a length of a period from the decrease start time to the arbitrary time and a length of a period from the decrease start time to the predetermined time, and the control program causes the computer to calculate the hysteresis amount at the arbitrary time, using the calculated weight and the comparison result parameter.

11. A engine control unit as claimed in claim 10, wherein when causing the computer to calculate the weight, the control program causes the computer to calculate the weight such that the weight is proportional to the period length ratio.

12. A engine control unit as claimed in claim 10, wherein when causing the computer to calculate the weight, the control program causes the computer to calculate the weight such that the weight is proportional to a radical root of the period length ratio.

13. A engine control unit as claimed in claim 9, wherein when causing the computer to calculate the comparison result parameter, the control program causes the computer to calculate the comparison result parameter based on the detected in-cylinder pressure and the motoring pressure obtained at a predetermined time during the exhaust stroke, and wherein when causing the computer to calculate the hysteresis amount, the control program causes the computer to detect a decrease start time at which the in-cylinder pressure starts decreasing after start of an expansion stroke of the engine, and calculate a weight of the comparison result parameter for the hysteresis amount at an arbitrary time between the decrease start time and the predetermined time, according to a ratio between a difference between the motoring pressure at the decrease start time and the motoring pressure at the arbitrary time and a difference between the motoring pressure at the decrease start time and the motoring pressure at the predetermined time, and the control program causes the computer to calculate the hysteresis amount at the arbitrary time, using the calculated weight and the comparison result parameter.

14. A engine control unit as claimed in claim 9, wherein the engine is configured to carry out fuel cut-off operation for cutting off supply of fuel to the engine when predetermined conditions are satisfied, the control program causes the computer to determine whether or not the fuel cut-off operation is being carried out, and wherein when causing the computer to calculate the hysteresis amount, the control program causes the computer to calculate the hysteresis amount based on the comparison result parameter calculated during the fuel cut-off operation.

15. A method of detecting in-cylinder pressure defined as pressure within a cylinder of an internal combustion engine, comprising:

an in-cylinder pressure-detecting step of detecting an in-cylinder pressure as a detected in-cylinder pressure;

a motoring pressure-estimating step of estimating the in-cylinder pressure generated when combustion is not performed in the cylinder, as a motoring pressure;

a hysteresis amount-calculating step of calculating a hysteresis amount indicative of a difference between the detected in-cylinder pressure and an actual in-cylinder pressure, based on the detected in-cylinder pressure and the motoring pressure obtained during an exhaust stroke of the engine; and a correction step of correcting the detected in-cylinder pressure based on the calculated hysteresis amount.

16. A method as claimed in claim 15, wherein said hysteresis amount-calculating step comprises a comparison result parameter-calculating step of calculating a comparison result parameter indicative of a result of comparison between the detected in-cylinder pressure and the motoring pressure, and includes calculating the hysteresis amount based on the calculated comparison result parameter.

17. A method as claimed in claim 16, wherein said comparison result parameter-calculating step includes calculating the comparison result parameter based on the detected in-cylinder pressure and the motoring pressure obtained at a predetermined time during the exhaust stroke, and wherein said hysteresis amount-calculating step further comprises a decrease start time-detecting step of detecting a decrease start time at which the in-cylinder pressure starts decreasing after start of an expansion stroke of the engine, and a weight-calculating step of calculating a weight of the comparison result parameter for the hysteresis amount at an arbitrary time between the decrease start time and the predetermined time according to a period length ratio between a length of a period from the decrease start time to the arbitrary time and a length of a period from the decrease start time to the predetermined time, and includes calculating the hysteresis amount at the arbitrary time, using the calculated weight and the comparison result parameter.

18. A method as claimed in claim 17, wherein said weight-calculating step includes calculating the weight such that the weight is proportional to the period length ratio.

19. A method as claimed in claim 17, wherein said weight-calculating step includes calculating the weight such that the weight is proportional to a radical root of the period length ratio.

20. A method as claimed in claim 16, wherein said comparison result parameter-calculating step includes calculating the comparison result parameter based on the detected in-cylinder pressure and the motoring pressure obtained at a predetermined time during the exhaust stroke, and wherein said hysteresis amount-calculating step further comprises a decrease start time-detecting step of detecting a decrease start time at which the in-cylinder pressure starts decreasing after start of an expansion stroke of the engine, and a weight-calculating step of calculating a weight of the comparison result parameter for the hysteresis amount at an arbitrary time between the decrease start time and the predetermined time, according to a ratio between a difference between the motoring pressure at the decrease start time and the motoring pressure at the arbitrary time and a difference between the motoring pressure at the decrease start time and the motoring pressure at the predetermined time, and includes calculating the hysteresis amount at the arbitrary time, using the calculated weight and the comparison result parameter.

21. A method as claimed in claim 16, wherein the engine is configured to carry out fuel cut-off operation for cutting off supply of fuel to the engine when predetermined conditions are satisfied, the method further comprising a fuel cut-off determination step of determining whether or not the fuel cut-off operation is being carried out, and wherein said hysteresis amount-calculating step includes calculating the hysteresis amount based on the comparison result parameter calculated during the fuel cut-off operation.

* * * * *